US009297425B2

(12) United States Patent
Mueller et al.

(10) Patent No.: US 9,297,425 B2
(45) Date of Patent: Mar. 29, 2016

(54) SYNCHRONIZER HUB

(75) Inventors: Alexander Mueller, Altmuenster (AT); Helmut Pamminger, Voecklabruck (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 14/342,597

(22) PCT Filed: Sep. 7, 2012

(86) PCT No.: PCT/AT2012/050133
§ 371 (c)(1),
(2), (4) Date: Mar. 4, 2014

(87) PCT Pub. No.: WO2013/033748
PCT Pub. Date: Mar. 14, 2013

(65) Prior Publication Data
US 2014/0224610 A1    Aug. 14, 2014

(30) Foreign Application Priority Data

Sep. 8, 2011 (AT) .................................... 1280/2011

(51) Int. Cl.
*F16D 11/14* (2006.01)
*F16D 23/06* (2006.01)
*F16D 11/00* (2006.01)

(52) U.S. Cl.
CPC ............... *F16D 11/14* (2013.01); *F16D 23/06* (2013.01); *F16D 2011/004* (2013.01); *F16D 2023/0637* (2013.01); *F16D 2023/0681* (2013.01)

(58) Field of Classification Search
CPC .............. F16D 2011/004; F16D 2023/0637; F16D 2023/0681
USPC .......................................................... 192/53.31
See application file for complete search history.

(56) References Cited

U.S. PATENT DOCUMENTS 2,410,511 A * 11/1946 Letsinger et al. .......... 192/53.31
5,135,087 A * 8/1992 Frost ....................... F16D 23/06
192/53.31

(Continued)

FOREIGN PATENT DOCUMENTS

AT           506 205 A1    7/2009
AT           508 295 A1   12/2010
DE    60 2004 007 563 T2    4/2008
DE    10 2008 047484 A1    4/2010

(Continued)

OTHER PUBLICATIONS

International Search Report of PCT/AT2012/050133, mailed Jan. 15, 2013.

*Primary Examiner* — Mark Manley
(74) *Attorney, Agent, or Firm* — Collard & Roe, P.C.

(57) ABSTRACT

The invention relates to a synchronizer hub (1) comprising a hub body (4) that, on the outer circumference (5) thereof, has a sleeve toothing (6) for engagement of a sliding sleeve (6a), said sleeve toothing being interrupted by at least one first axial recess (7) and by at least one second axial recess (8), wherein the first axial recess (7) has first lateral faces (14, 15) and the second axial recess (8) has second lateral faces (17, 18), and wherein the first lateral faces (14, 15) are inclined to the axial direction at a first angle (20). The second lateral faces (17, 18) of the second axial recess (8) run at a second angle (21) to the axial direction, wherein the second angle (21) is not equal to the first angle (20) of the first lateral faces (14, 15).

13 Claims, 4 Drawing Sheets

(56) References Cited

U.S. PATENT DOCUMENTS

| | | |
|---|---|---|
| 5,544,727 A | 8/1996 | Braun |
| 2010/0252386 A1 | 10/2010 | Hiraiwa |
| 2010/0263979 A1 | 10/2010 | Pamminger et al. |
| 2011/0185833 A1 | 8/2011 | Hackl et al. |

FOREIGN PATENT DOCUMENTS

| | | | |
|---|---|---|---|
| EP | 0463899 | * | 5/1991 |
| EP | 2 236 847 A2 | | 10/2010 |
| JP | 2006226515 A | | 8/2006 |
| WO | 2010/015011 A1 | | 2/2010 |

* cited by examiner

SYNCHRONIZER HUB

CROSS REFERENCE TO RELATED APPLICATIONS

This application is the National Stage of PCT/AT2012/050133 filed on Sep. 7, 2012, which claims priority under 35 U.S.C. §119 of Austrian Application No. A 1280/2011 filed on Sep. 8, 2011, the disclosure of which is incorporated by reference. The international application under PCT article 21(2) was not published in English.

The invention relates to a synchronizer hub with a hub body which comprises on its outer circumference a sleeve toothing for the engagement of a sliding sleeve which is interrupted by at least one first axial recess and at least one second axial recess, wherein the first axial recess comprises first lateral faces and the second axial recess comprises second lateral faces, and wherein the first lateral faces are designed to be inclined relative to the axial direction at a first angle. The invention also relates to a transmission synchronization device with at least one shaft, with a synchronizer hub, which is arranged on the at least one shaft and comprises the at least one first and at least one second axial recess spaced apart therefrom, with a sliding sleeve which is arranged radially above the synchronizer hub and is axially displaceable, with a shifting gear for each shifting direction each with a toothing, which are arranged in axial direction adjacent to the synchronizer hub, each with a coupling body for each shifting gear which are each arranged on a shifting gear and pointing in the direction of the synchronizer hub, with two synchronizer rings, one of which is arranged in axial direction between the synchronizer hub and a shifting gear, preferably with a conical friction ring for each synchronizer ring, which is arranged in radial direction underneath the synchronizer ring, and with at least one pressure part for the first shifting direction, which is mounted in the at least one first axial recess, and with at least one second pressure part for the second shifting direction, which is mounted in the at least one second axial recess.

Various different embodiments of self-reinforcing gear synchronizations are known from the prior art. The latter comprise a pressure part, on which so-called servo oblique faces are formed, which interact with corresponding servo oblique faces of the synchronizer hub and thereby produce an additional force during the shifting process. In this way there is a considerable improvement in the shifting comfort.

The objective of the invention is to create a transmission synchronization which enables the transmission of higher torques.

Said objective of the invention is achieved by the aforementioned synchronizer hub and independently thereof by the aforementioned transmission synchronization device, in which with the synchronizer hub the second lateral faces of the second axial recess run at a second angle to the axial direction, wherein the second angle is not equal to the first angle of the first lateral faces and wherein the transmission synchronization device is equipped with the synchronizer hub.

It is an advantage in this case that it is possible by means of the different angles of the lateral faces of the axial recesses, in the region of the web-like segments which support the sleeve toothing, to achieve a greater mechanical loadability, as compared to previously conventional axial recesses of identical form in both shifting directions the synchronizer hub has a greater material volume, in particular in the "weakened" area underneath the sleeve toothing. It is possible in this way with the same compact structural size of the synchronizer hub—compared to synchronizer hubs known from the prior art—to transmit higher torques after the shifting process. In particular, this geometric configuration of the synchronizer hub is an advantage if the latter is made from a sintered, material. In this way a reduction of the components is possible compared to the embodiments of the prior art.

According to one embodiment variant the first lateral faces are arranged at the first angle only in one shifting direction of the synchronizer hub. In this way the shifting forces can be harmonized and the driving comfort, i.e. the shifting comfort, can be improved.

In the preferred embodiment variant of the synchronizer hub the value of the second angle of the second lateral faces is at least approximately 0°. At least approximately 0° means in this case that it is possible to have slight deviations caused by production that are a maximum of 0.5°, in particular a maximum of 0.2°.

The second lateral faces in this embodiment variant are thus aligned to be at least approximately parallel, in particular parallel, to the axial direction or are perpendicular to the axial end faces of the synchronizer hub. In this way there is a further improvement with respect to the transmissible torques. In addition, in this way the transmission synchronization device can be produced more inexpensively, as in the latter more identical parts can be used with regard to the synchronizer hubs in the whole transmission. With this embodiment variant it is also possible to achieve a further harmonization of the shifting forces, for example if e.g. the second gear of a transmission does not require any optimization with regard to the shifting forces.

Preferably, there are a plurality of first and a plurality of second axial recesses, wherein the first and second axial recesses are arranged alternately, in order to achieve in this way a better distribution of forces in the synchronizer hub.

Axially inner end sections of the first lateral faces can be at an angle. In this way a further reinforcement of the web segments underneath the sleeve toothing is achieved which has a positive effect on the level of transmissible torques.

Likewise a further reinforcement of said web segments is achieved if the at least one second axial recess in axial direction has a smaller maximum cross section than the at least one first axial recess.

It is also possible that only the at least one second axial recess has a radial bore in the base surface delimiting the latter radially at the bottom. Said radial bores are known to be used for partly mounting a spring element, by means of which the pressure part is pushed against the sliding sleeve. By avoiding every second radial bore further weakening of the hub body can be reduced.

According to one embodiment variant of the transmission synchronization device, in both shifting directions the synchronizer rings are configured to be free of axial drive cams for mounting in the respective pressure part. In other words the pressure parts bear only on the respective synchronizer ring. In this way both the pressure parts and the synchronizer rings are geometrically simpler, whereby the latter can be produced more easily, particularly if said components of the transmission synchronization device are produced by means of a powder-metallurgical method. In addition, in this way also the loadability of the synchronizer rings can be improved, as the latter comprise elements projecting less far in axial direction, whereby in combination with the synchronizer hub higher torques can be transmitted.

To avoid the "overwinding" of the synchronizer rings during the shifting process it is possible for the synchronizer rings to comprise stop surfaces for delimiting the relative rotatability in relation to the synchronizer hub, the stop surfaces interacting with the lateral walls of the axial recesses of the synchronizer hub.

To generate a presynchronization force the at least one first pressure part can comprise at least one servo face inclined relative to the axial direction. The at least one second pressure part is however preferably free of such servo faces. In cooperation with the synchronizer hub described above by means of said latter pressure parts it is possible that the sliding sleeve remains at least almost centered in the neutral position.

Preferably, the at least one first pressure part with the servo faces is connected to the at least one friction ring via an axial drive cam. In this way signs of wear on the friction rings have no (substantial) influence on the precision of the synchronization. In addition, in this way a compact embodiment of the transmission synchronization device is made possible, which because of the synchronizer hub described above enables the transmission of higher torques.

It is also possible in order to improve these effects that the at least one second pressure part is also connected to at least one friction ring via an axial drive cam.

However, it is also possible for the synchronizer ring for one shifting direction to be connected to the corresponding pressure part for this shifting direction via a drive cam. In this way it is possible to configure the synchronizer ring without locking teeth and to arrange locking teeth on the pressure part, whereby the synchronizer ring can be configured to be structurally simpler with uniform compactness and a greater component strength.

Usually in one configuration the toothing of the first shifting gear has a smaller number of teeth than the toothing of the second shifting gear. Preferably, in this case the pressure parts with the at least one servo face are arranged in the shifting direction with the shifting gear, the toothing of which has fewer teeth, whereby higher transmissible torques can be achieved at higher gears. In general, the servo faces are preferably arranged in the shifting direction which points to the shifting gear which is driven at the lower speed and transits the higher torques. Thus in a twin shaft gearbox exactly the reverse situation may occur, in that the pressure part with the at least one servo face is arranged in the shifting direction with the shifting gear, the toothing of which has more teeth.

In order to provide a transmission synchronization device that is as compact as possible for higher transmissible torques it is possible for at least one second, conical friction ring for at least one shifting direction to be arranged between the first friction ring and the synchronizer ring, wherein said second friction ring engages with at least one drive cam in a recess of the coupling body.

For a better understanding of the invention the latter is explained in more detail with reference to the following Figures.

In a schematically simplified representation.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 1:
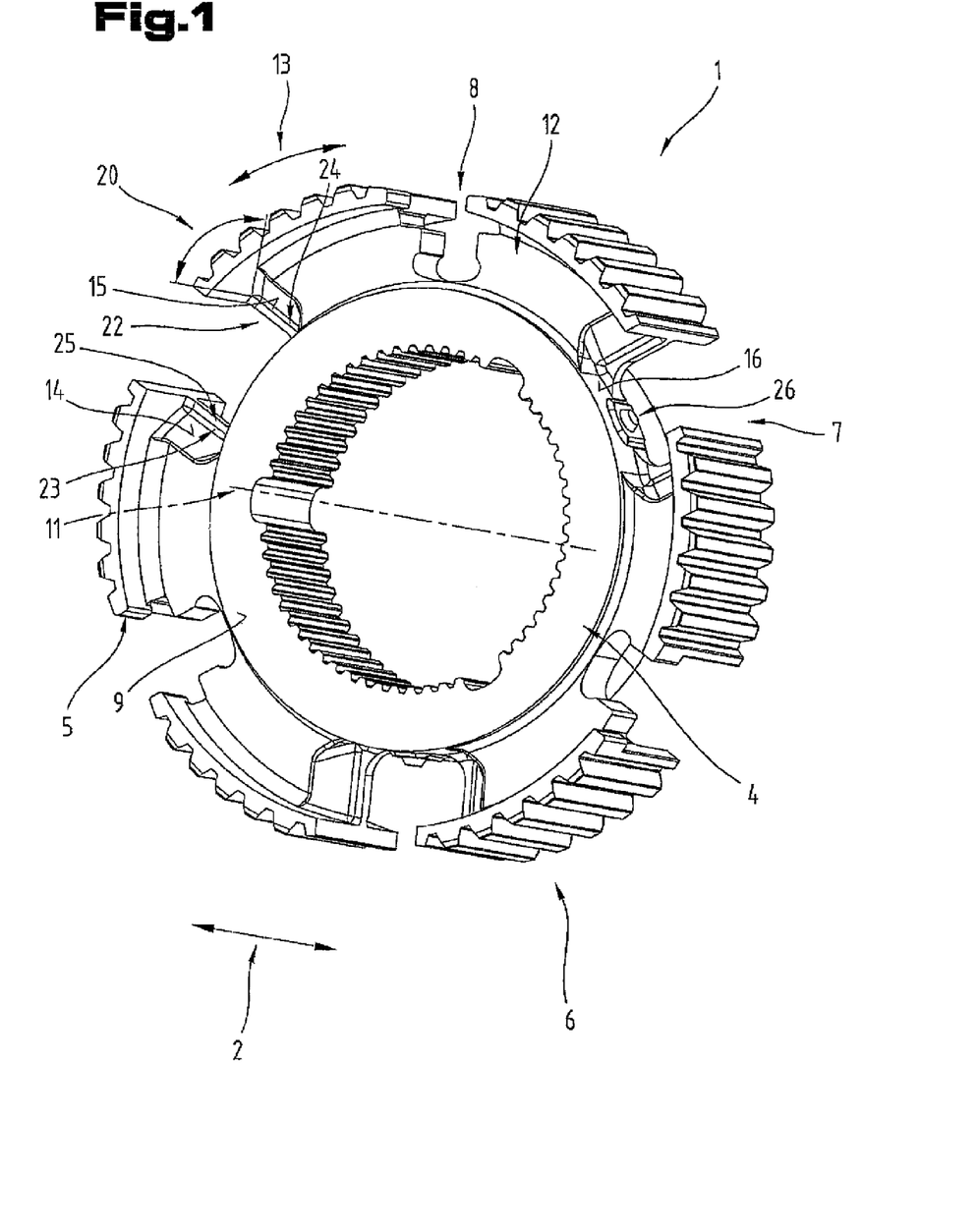
FIG. 1 shows a synchronizer hub in an oblique view seen from the direction of the first shifting direction.
Figure 2:
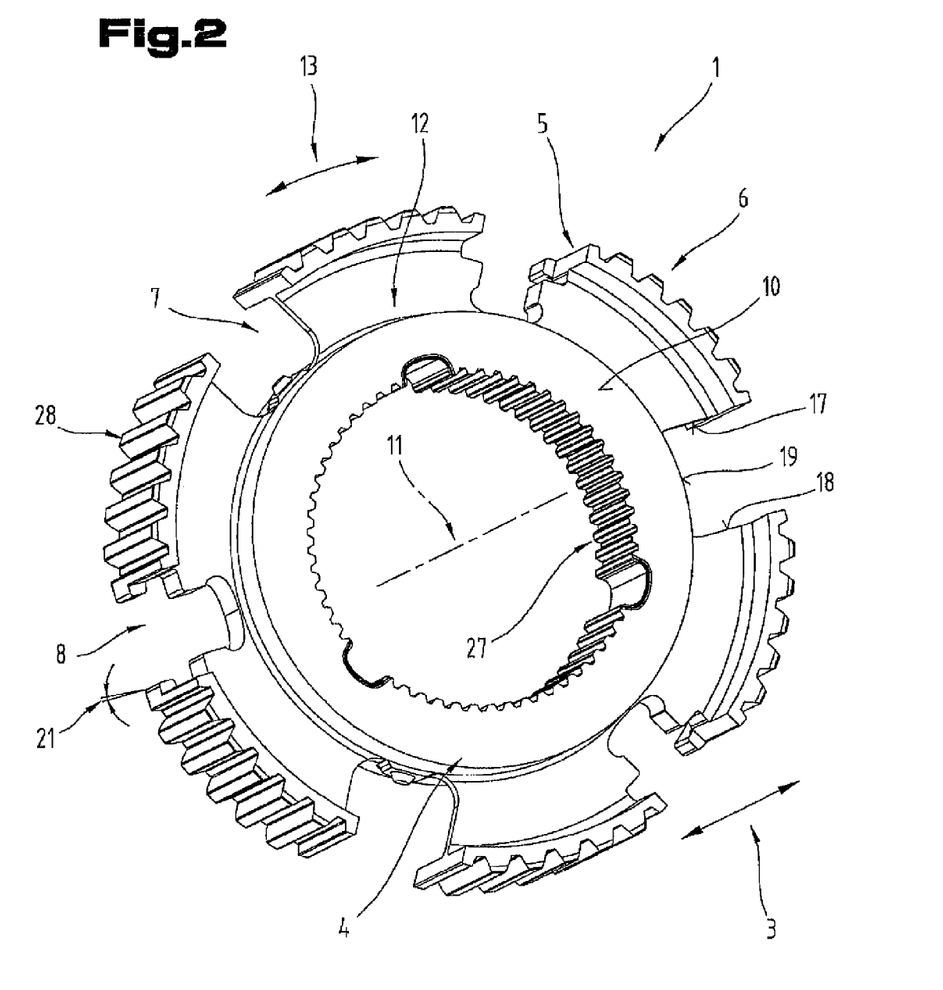
FIG. 2 shows the synchronizer hub according to FIG. 1 in an oblique view from the direction of the second shifting direction.
Figure 3:
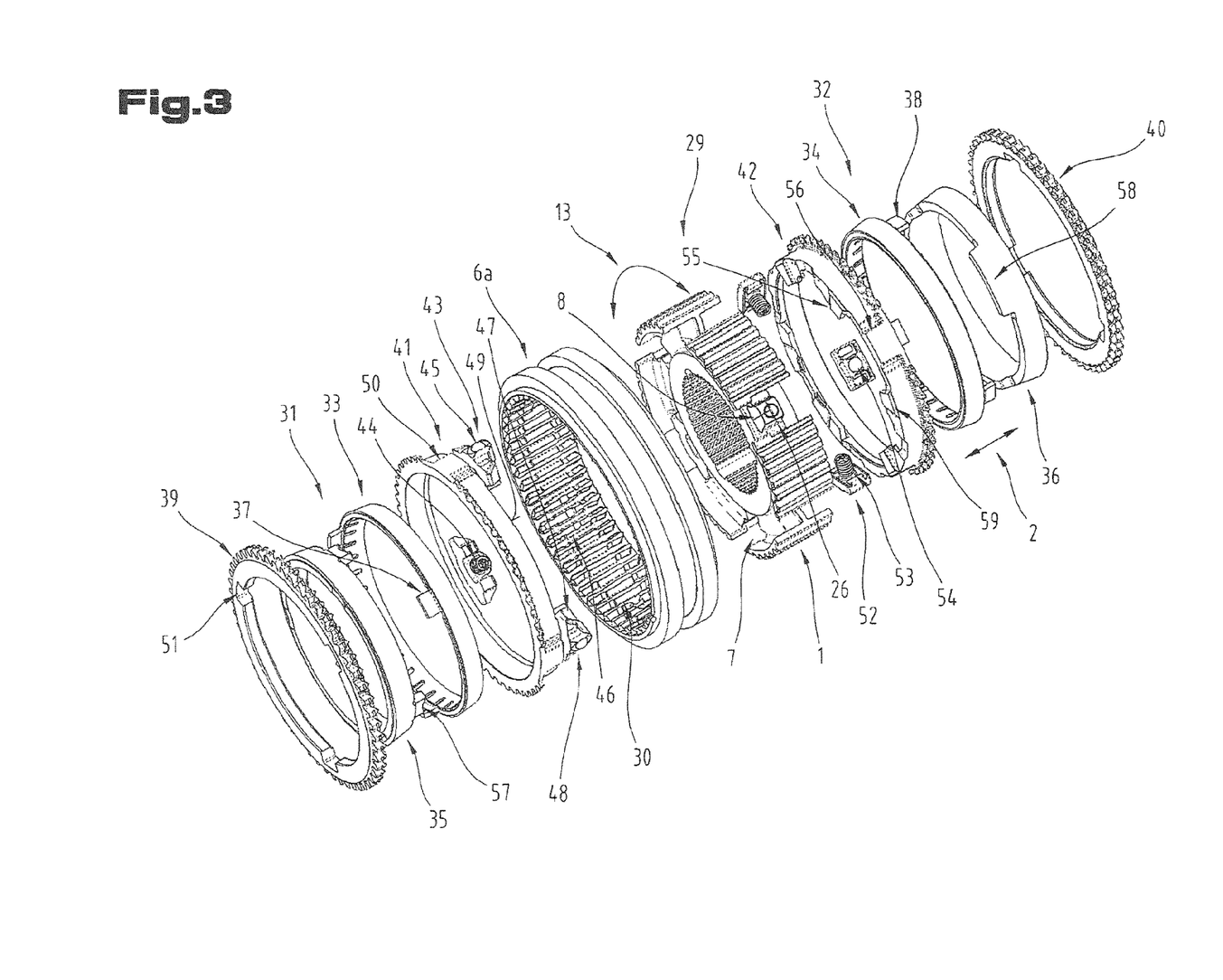
FIG. 3 shows a first embodiment variant of a transmission synchronization device in an exploded view.

FIGS. 1 and 2 show an embodiment variant of a synchronizer hub 1 in an oblique view from a first shifting direction 2 (FIG. 1) or a second shifting direction 3 (FIG. 2). The synchronizer hub 1 comprises a hub body 4. The hub body 4 is provided on an outer circumference 5 with a sleeve toothing 6 for the engagement of a sliding sleeve 6a (FIG. 3). The sleeve toothing 6 is interrupted by at least one first axial recess 7 and at least one second axial recess 8. The axial recesses 7, 8 extend continuously from a first end face 9 to a second end face 10, which is formed on the hub body 4 opposite the first end face 9 along a central axis 11. The hub body 4 thus has on its circumference 5 a plurality of hub body segments 12 as carriers of the sleeve toothing 6 interrupted in circumferential direction 13, as shown in FIGS. 1 and 2.

In the shown embodiment variant for each shifting direction 2, 3 three first and three second axial recesses 7, 8 are formed. However, there can also be a different number of first and second axial recesses 7, 8, for example one, two, four, five, six etc., whereby also a different number of first and second axial recesses 7, 8 can be formed, for example only one first axial recess 7 and two second axial recesses 8, etc., or vice versa.

In the preferred embodiment variant the axial recesses 7, 8 are arranged offset respectively by 60° (relative to the radial middle line through the axial recesses 7, 8) on the circumference 5, whereby the first and the second axial recesses 7, 8 are arranged alternately so that the first axial recesses 7 and the second axial recesses 8 are offset relative to one another by 120° respectively. With a different number of axial recesses 7, 8 said angles differ accordingly from the given values, as in the preferred embodiment variant the axial recesses 7, 8 are distributed symmetrically over the circumference 5.

If in the following, for reasons of simplicity, only a first and a second axial recess 7, 8 are referred to, these explanations are of course applicable or apply to preferably a plurality of first and/or more second axial recesses 7, 8.

The first axial recess 7 is delimited in circumferential direction 13 by first lateral faces 14, 15. A first base surface 16 extends in circumferential direction between the first lateral faces 14, 15. The second axial recess 8 is delimited in circumferential direction 13 by second lateral faces 17, 18. A second base surface 19 extends in circumferential direction 13 between the second lateral faces 14, 15. The first lateral faces 17, 18 are inclined relative to the axial direction in the direction of the central axis 11 by a first angle 20. The angle 20 can be between 10° and 89°, in particular between 25° and 45°, preferably between 45° and 60°.

The two lateral faces 14, 15 are preferably inclined opposite one another relative to the axial direction, so that the axial recess widens in outwards direction (end face 9), i.e. a maximum diameter of the first axial recess 7 is greater in this direction. Preferably, the angle 20 is the same size with respect to its absolute value for both first lateral faces 14, 15. However, embodiment variants of the synchronizer hub 1 are also possible in which the absolute values of the first lateral face 14 are different from the absolute values of the first lateral faces 15.

The second lateral faces 17, 18 of the second axial recess 8 run at a second angle 21 to the axial direction. The second angle 21 is not equal to the first angle 20 of the first lateral faces 17, 18, in particular is smaller. The second angle 21 can be between 0° and 60° or between 1° and 30° or between 2° and 15°. In the preferred embodiment variant shown in FIGS. 1 and 2 of the synchronizer hub 1 the second angle 21 is 0° or at least approximately 0°.

The two second lateral faces 17, 18 can also be inclined opposite one another relative to the axial direction, so that the axial recess widens towards the outside (end face 10), i.e. a maximum diameter of the second axial recess 8 is larger in this direction. Provided the second lateral faces 17, 18 of the second axial recess 8 are inclined relative to the axial direction, the second angle 21 is of equal size with respect to its absolute value for the two second lateral faces 17, 18. However, embodiment variants of the synchronizer hub 1 are also possible in which the absolute values of the second lateral face 17 are different from the absolute values of the second lateral faces 18.

In the preferred embodiment variant of the synchronizer hub 1 the first lateral faces 14, 15 are arranged at the first angle 20 as shown in FIGS. 1 and 2 only on the side of the first shifting direction 2 on the synchronizer hub 1, i.e. said first axial recesses 7 widen only in one direction (to the end face 9). The same applies to the second axial recesses 8, which are preferably arranged only on the side of the second shifting direction 3 on the synchronizer hub 1. In principle, the first axial recesses 7 and/or the second axial recesses 8 can be arranged on both sides (both shifting directions 2, 3) of the synchronizer hub 1, whereby in this case respectively an alternating arrangement is preferred, i.e. the first axial recesses 7 and/or the second axial recesses 8 are arranged alternately (relative to the circumferential direction 13) on the first and the second side (first end face 9 and second end face 10) of the synchronizer hub 1.

The oblique lateral faces 14, 15 can extend into a central plane between the end faces 9, 10 or end in front of or after the latter.

As shown in FIG. 1, axially inner end sections 22, 23 of the first lateral faces 14, 15 can be at an angle 24, 25. The angles 24, 25 are preferably oriented parallel to the end faces 9, 10 of the hub body 4.

It is also preferably possible for the second axial recess 8 as viewed in axial direction to have a smaller maximum cross section than the first axial recess 7, as shown in FIGS. 1 and 2. However, it is also possible for said cross sections to be at least approximately of equal size.

In general said cross sections of the first and second axial recess 7, 8 can be adapted with respect to their geometric form to the requirements for arranging so-called pressure parts, so that said cross sections can have very different forms, for example approximately rectangular or U-shaped etc.

According to a further embodiment variant the hub body 4 comprises only in the base surface 16 of the first axial recess 7 a radial elevation 26 or a radial bore, in particular a blind bore. In particular, in embodiment variants in which the second angle 21 by which the second lateral faces 17, 18 of the second axial recess 8 can be inclined relative to the axial direction or the axial plane parallel thereto, it is possible for the base surface 19 of the second axial recess 8 to have such a radial elevation 26 or a radial bore (not shown).

The hub body 4 also comprises a radially inner toothing 27 by means of which the synchronizer hub 1 can be secured in a non-rotational manner onto a shaft. As such (plug-in) toothings are known from the prior art, reference is made to the latter in this respect. Likewise with regard to the geometric configuration of the teeth 28 of the sleeve toothing reference is made to the relevant prior art, in particular with regard to the locking toothing or the pitch of the teeth 28.

Furthermore, the synchronizer hub 1 can comprise corresponding recesses for guiding a lubricant oil for the sleeve toothing 6, etc. as also known from the prior art.

The hub body segments 12 can be configured to spring back in axial direction with respect to the two end faces 9, 10 of the hub body 4 and the width of the sleeve toothing 6, i.e. have a smaller width than the sleeve toothing 6 in axial direction.

FIG. 3 shows in part a first embodiment variant of a transmission synchronization device 29 with the synchronizer hub 1 described above in an exploded view. For example the latter can be used for the gear position $1^{st}$ and $2^{nd}$ gear.

Transmission synchronization devices of this kind are known to be used for coupling in a non-rotational manner two adjacent idler gears, i.e. shifting gears (not shown), optionally to a shaft (not shown) or releasing the latter.

The transmission synchronization device 29 comprises in addition to the synchronizer hub 1, which is secured by conventional means axially non-displaceably on the shaft, the sliding sleeve 6a which is mounted in a non-rotational manner, but axially displaceably on the synchronizer hub 1, wherein a sliding sleeve inner toothing 30 which is formed on a radially inner surface of the sliding sleeve engages with the sleeve toothing 6 of the synchronizer hub 1. The sliding sleeve 6a can be operated by a shift fork (not shown).

Furthermore, the transmission synchronization device 29 comprises for each shifting direction a friction package 31, 32 consisting at least of an outer conical ring 33, 34 and an inner conical ring 35, 36, wherein on the conical rings 33 to 36 conventional friction linings can be provided on the corresponding interacting surfaces. The outer conical rings 33, 34 comprise at least one, preferably three, axially projecting cam 37, 38, which is connected in rotational direction in a form-fitting manner to a coupling body 39, 40. The coupling bodies 39, 40 are connected in a non-rotational manner to the respective not shown idler gear, i.e. the gear wheel. For example, the coupling bodies 39, 40 can fit on a cone of the respective idler gear in a non-rotational manner, wherein corresponding free spaces can be provided on coupling bodies 39, 40 and cams complementary thereto can be provided on cones of the idler gears. The coupling bodies 39, 40 are arranged in axial direction i.e. substantially between the idler gears and the synchronizer hub 1.

It is also possible for the gear wheel to comprise for example a cone, with a spur toothing, and for the respective coupling body 39, 40 to comprise a spur toothing fitting therewith, whereby the non-rotational arrangement of the respective coupling body 39, 40 on the gear wheel is made possible. It is also possible for the coupling body 39, 40 to be welded to the idler gears or designed in one piece with the latter.

A synchronizer ring 41, 42 is arranged radially outside and above the friction packages 31, 32 on both sides of the synchronizer hub 1 respectively between the latter and the respective idler gear.

The synchronizer hub 1 comprises, as already explained above, at least one, preferably three, first axial recesses) 7 and at least one, preferably three, second axial recess(es) 8.

For each first axial recess 8 between the synchronizer hub 1 and the sliding sleeve 6a on the one hand and in axial direction between the synchronizer rings 41, 42 on the other hand a servo pressure part 43 is arranged such that the latter is pretensioned, by a spring element 44, which is arranged on the radial elevation 26 or in the radial bore of the synchronizer hub 1 on the one hand and a recess on the lower side in the servo pressure part 43 on the other hand, against the sliding sleeve 6a by a ball 45 arranged on a side of the servo pressure part 43 opposite the spring element 44, which interact on the one hand in the recess of the servo pressure part 43 with the spring element 44 and on the other hand in a recess 46 on the lower side of the sliding sleeve 5, which faces towards the synchronizer hub 1. The recess for the spring element 44 in the servo pressure part 43 can also be configured to be continuous through the latter. Instead of a ball a roller can be used or in general a rolling body with a corresponding adaptation of the mount thereof. It is also possible to omit the spring pretensioning and position the servo pressure part 43 by means of the centrifugal forces occurring during the operation of the transmission synchronization device 29.

The spring element 44 can be configured as in the shown exemplary embodiment as a spiral spring, likewise with a slight adaption a configuration with a diaphragm element, an annular spring or a pneumatic spring is possible.

The frictional torque acting on the friction packages 6 during the shifting process is determined in part by the spring rate of the spring element 44.

By means of the servo pressure part 43 a circumferential force bearing on the latter, which is caused by the frictional torque on the fiction package 31 during the synchronization process, is converted into an additional axial force and thus an increase in force is achieved.

As shown in FIG. 3, the servo pressure part 43, as seen in side view, has an approximately u-shaped cross section. In the center, i.e. between the two branches of said profile cross section the spring element 44 and the ball are arranged as described above.

The servo pressure part 43 comprises at opposite distal end sections in the direction of its longitudinal extension, i.e. the circumferential direction 13 of the synchronizer hub 1, an oblique servo face 47, 48, by means of which during the cooperation with the oblique first lateral faces 14, 15 in the first axial recess 7 of the synchronizer hub 1 a presynchronization force can be produced during the shifting process.

The servo pressure part 43 engages on an end face 49 of the synchronizer ring 41, which points in the direction of the synchronizer hub 1. By means of a free space in the servo pressure part 43 in the region of the synchronizer ring 41 the servo pressure part 43 can comprise two bearing faces on the synchronizer ring 41.

The servo pressure part 43 is arranged with play between the first lateral faces 14, 15, whereby its rotation or axial displacement is possible in the first axial recess 7. By means of the rotation or axial displacement of the servo pressure part 43, caused by the displacement of the sliding sleeve 6a and the coupling with the inner conical ring 35, by means of the oblique servo faces 47 or 48 a servo force is generated in addition to the axial force owing to the shifting force via the shift fork which engages in the sliding sleeve 6a and thus creates an increase in power. This increase is power is thus independent of the wear in the friction packages 6.

In the transmission synchronization device 29 the coupling of the inner conical ring 35, i.e. the friction ring, is not with the synchronizer ring 41 but with the servo pressure part 43, so that the synchronizer ring 41 can be designed to be structurally simpler. The synchronizer ring 41 preferably does not comprise downwardly projecting coupling elements or extensions in axial direction or radial direction as stop surfaces for spring elements. Its end face pointing towards the synchronizer hub 1 is configured to be at least substantially flat.

The servo pressure part 43 is moved in the transmission synchronization device 29 in axial direction and in circumferential direction, a radial movement does not occur (with the exception of the spring element 44).

Although the servo pressure part 43 shown in FIG. 3 is preferably used in the transmission synchronization device 29 for one shifting direction, other servo pressure parts 43 known from the prior art can be used after a suitable adaptation of the transmission synchronization device 29.

The synchronizer ring 41 comprises at least one cam-like elevation 50 which interacts with the first axial recess 7 of the synchronizer hub in order to delimit the rotatability of the synchronizer ring 41.

The coupling body 39 comprises one recess 51 for each projection 37 of the outer conical ring 33 of the friction package 6, so that the outer conical ring 33 can be coupled to the coupling body 39.

For the sake of completion it should be noted that the two idler gears (shifting gears) connect respectively to the coupling body 39 or 40, wherein the coupling bodies 39, 40 are arranged between the respective idler gear and the synchronizer hub 1. The idler gears are known to have a toothing, the number of teeth in the two toothings being different, i.e. one idler gear has a greater number of teeth than the other idler gear of the transmission synchronization device 29.

In the presence of a plurality of servo pressure parts 43 the latter are preferably arranged in a shifting direction, i.e. for example in the shifting direction 2, acting in the synchronizer hub 1 (in FIG. 3 left of the synchronizer hub 1).

For the other shifting direction, i.e. for example shifting direction 3 (in FIG. 3 right of the synchronizer hub 1) in the second axial recesses 8 of the synchronizer hub 1 either servo pressure parts are arranged comprising servo faces, at an angle different from the angle of the servo faces 47, 48 with the axial direction, in particular at a smaller angle, or preferably so-called pressure bar 52 are arranged with no servo oblique faces. The pressure bars 52 are also pretensioned against the sliding sleeve 6a by a spring element 53, for example a spiral spring, and ensure for example the centering of the sliding sleeve 6a in the neutral position. In addition, the pressure bars 52 can comprise an at least approximately semi-spherical central elevation 54, which engage in further recesses 46 in the region of the sliding sleeve inner toothing 30.

The pressure bars 52 can be designed according to the prior art and for example can have in plan view an at least approximately rectangular cross section, as shown in FIG. 3.

In this shifting direction 3 the synchronizer ring 42 also bears only via an end side 55 of a radially outwardly pointing, cam-like elevation 56 on the pressure bar 52, whereby for each pressure bar 52 (preferably three are used) an elevation 56 is provided.

Thus both synchronizer rings 41, 42 for both shifting directions 2, 3 can be configured to be free of axial drive cams for mounting in the respective servo pressure part 43 or pressure bar 52.

The synchronizer ring 42 is pushed during the synchronization by the pressure bar 52 owing to the displacement of the sliding sleeve 6a against the frictional faces of the outer conical ring 32.

It is also possible for the synchronizer rings 41, 42 to comprise stop surfaces for delimiting the relative rotatability in relation to the synchronizer hub 1, wherein the stop surfaces interact with the lateral walls of the axial recesses 7, 8 of the synchronizer hub 1. The stop surfaces can be configured on the cam-like elevations 50, 56 of the synchronizer rings 41, 42 in circumferential direction 13.

According to one embodiment variant the servo pressure part 43 is connected to the inner friction ring 35 via an axial drive cam 57.

It is also possible for the second servo pressure part for the second shifting direction 3 to be connected to the inner friction ring 36 by an axial drive cam. In the embodiment variant of the transmission synchronization device 29 shown in FIG. 3 however the inner friction ring 36 is connected with at least one axial drive cam 58 to the synchronizer ring 42 for said shifting direction 3, for which reason the synchronizer ring 42 can comprise radially downwards pointing projections 59, between which the projections 59 engage and form the thereby radial delimitations of the relative rotatability of the inner friction ring 36 in relation to the synchronizer ring 42.

Figure 4:
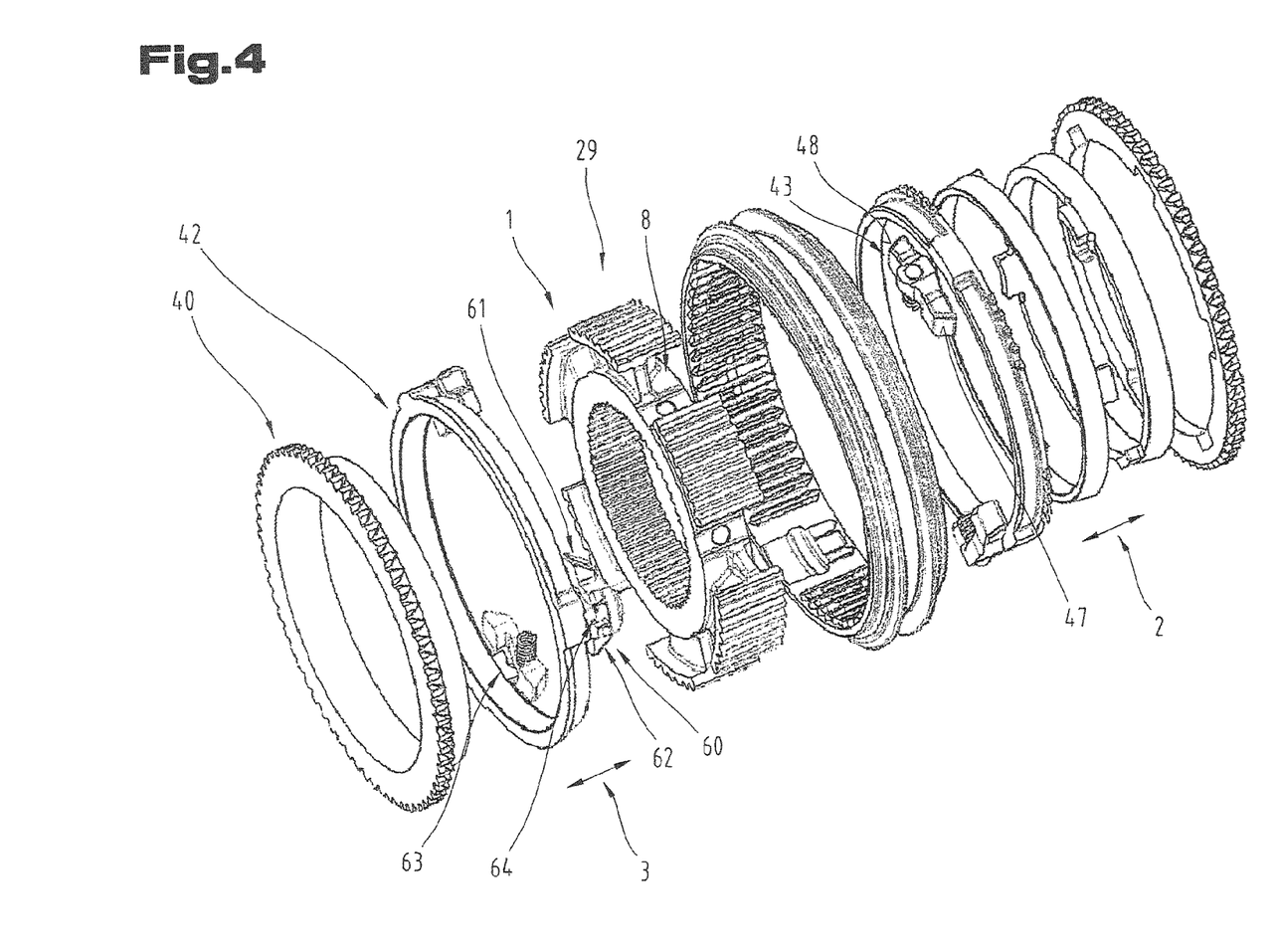
FIG. 4 shows a second embodiment variant of a transmission synchronization device in an exploded view.

FIG. 4 shows another embodiment variant of the transmission synchronization device 29, for example for $3^{rd}$ gear and $4^{th}$ gear. The part of said transmission synchronization device 29 on the left of the synchronizer hub 1 for the shifting direction 2 corresponds to the part on the left next to the synchronizer hub 1 for the shifting direction 2 of the transmission synchronization device 29 according to FIG. 3, and reference is made to the above explanations to avoid unnecessary repetition.

The transmission synchronization device 29 according to FIG. 4 differs from the one according to FIG. 3 in the design for the shifting direction 3. Instead of at least one pressure bar 52 in this embodiment variant at least one further servo pressure part 60 (preferably three) is provided, which also has servo faces 61, 62 on the distal end sections which are inclined preferably relative to the servo faces 47, 48 of the first servo pressure parts 43 at a different angle to the axial direction. Said additional servo pressure part 60 is arranged in the second axial recess 8 of the synchronizer hub 1 and interacts with the corresponding lateral faces 17, 18 (FIG. 2) during the synchronization.

Unlike the previous embodiment variant of the transmission synchronization device 29 however the additional servo pressure part 60 is operatively connected to the synchronizer ring 42 by a drive cam 63 arranged thereon, wherein the drive cam 63 protrudes in axial direction on the synchronizer ring 42 in the direction of the other servo pressure part 60 and engages in a recess 64 formed therein in axial direction.

Although in FIG. 4 the shifting direction 3 is not shown, it is possible that the transmission synchronization device 29 comprises in shifting direction 3 in addition to the synchronizer ring 42 and the coupling body 40 at least one conical ring, as shown in FIG. 3. In general, it is possible within the scope of the invention to configure the transmission synchronization device 29 as a single-cone or multiple-cone synchronization device.

In all of the embodiment variants of the transmission synchronization device 29 preferably the pressure parts with the at least one servo face 47, 48 or with the at least one servo face 47, 48, which encloses a larger angle relative to the axial direction, is arranged in the shifting direction in which a higher torque is transmitted, i.e. for example in the shifting direction with the shifting gear, the toothing of which has fewer teeth or is operated at a lower speed than the other shifting gear.

It should be noted that the angle that the servo faces 47, 48, 61, 62 form with the axial direction can correspond to that of the corresponding, inclined lateral faces 14, 15, 17, 18 of the first or second axial recess 7, 8, and thus reference is made to the above explanations.

The invention also comprises in addition to the synchronizer hub 1 a transmission synchronization device 29 in particular comprising at least one shaft, a synchronizer hub 1, which is arranged on the at least one shaft, and which comprises at least two spaced apart axial recesses 7, 8, a sliding sleeve 6a, which is arranged radially above the synchronizer hub 1 and is axially displaceable, two shifting gears each with a toothing, one of which is arranged respectively in an axial direction adjacent to the synchronizer hub 1, wherein the toothing of one shifting gear has a smaller number of teeth than the toothing of the other shifting gear, a coupling body 39, 40 for each shifting gear respectively, each arranged on a shifting gear and pointing in the direction of the synchronizer hub 1, two synchronizer rings 41, 42, one of which is arranged in axial direction between the synchronizer hub 1 and a shifting gear respectively, at least one conical friction ring per synchronizer ring 41, 42, arranged in radial direction underneath the synchronizer ring 41, 42, at least one pressure part (servo pressure part 43 or 60 and pressure bar 52) per shifting direction 2, 3, wherein a pressure part is mounted respectively in an axial recess 7, 8, and wherein at least one pressure part comprises at least one servo face 47, 48, 61, 62 inclined relative to the axial direction and the at least one further pressure part is free of such servo faces, wherein in both shifting directions the synchronizer rings 41, 42 are configured to be free of axial drive cams for mounting in the respective pressure part, and the synchronizer rings 41, 42 also comprise stop surfaces for delimiting the relative rotatability with respect to the synchronizer hub 1, wherein the stop surfaces interact with the lateral walls of the axial recesses of the synchronizer hub 1, and wherein the at least one pressure part is connected to the servo faces 47, 48, 61, 62 with the at least one friction ring by an axial drive cam 58.

Furthermore, the invention also comprises in particular a transmission synchronization device 29 comprising at least one shaft, synchronizer hub 1, which is arranged on the at least one shaft, and which comprises at least two spaced apart axial recesses 7, 8, a sliding sleeve 6a, which is arranged radially above the synchronizer hub 1 and is axially displaceable, with two shifting gears each with a toothing, one of which is arranged respectively in an axial direction adjacent to the synchronizer hub 1, wherein the toothing of one shifting gear has a smaller number of teeth than the toothing of the other shifting gear, a coupling body 39, 40 for each shifting gear respectively, each arranged on a shifting gear and pointing in the direction of the synchronizer hub 1, two synchronizer rings 41, 42, one of which is arranged in axial direction between the synchronizer hub 1 and a shifting gear respectively, at least one conical friction ring per synchronizer ring 41, 42, arranged in radial direction underneath the synchronizer ring 41, 42, at least one pressure part (servo pressure part 43 or 60 and pressure bar 52) per shifting direction 2, 3, wherein a pressure part is mounted respectively in an axial recess 7, 8, and wherein the pressure parts each comprise at least one servo face 47, 48, 61, 62 inclined relative to the axial direction,
wherein
in both shifting directions the synchronizer rings 41, 42 are configured to be free of axial drive cams for mounting in the respective pressure part, and the synchronizer rings 41, 42 also comprise stop surfaces for delimiting the relative rotatability with respect to the synchronizer hub 1, wherein the stop surfaces interact with the lateral walls of the axial recesses of the synchronizer hub 1, and wherein the pressure part in shifting direction 3 is connected respectively to at least one friction ring by an axial drive cam 58,
or the synchronizer ring 42 for the shifting direction 3 is connected to the corresponding pressure part for said shifting direction by a drive cam 58, and the synchronizer rings 41, 42 also comprise stop surfaces for delimiting the relative rotatability with respect to the synchronizer hub 1, wherein the stop surfaces interact with the lateral walls of the axial recesses of the synchronizer hub, and the pressure parts are connected respectively to at least one friction ring by an axial drive cam 57.

The synchronizer hub 1 can be arranged in transmissions with ascending gears, e.g. 1-2, 3-4, etc. or with a high and low gear, e.g. 1-5, 1-7, 2-4, 2-6, etc.

The exemplary embodiments show possible embodiment variants of the synchronizer hub 1 and the transmission synchronization device 29, whereby it should be noted at this point that various different combinations of the individual embodiment variants are also possible and this variability, due to the teaching on technical procedure, lies within the ability of a person skilled in the art in this technical field.

Finally, as a point of formality, it should be noted that for a better understanding of the structure of the synchronizer hub 1 and the transmission synchronization device 29 the latter have not been represented true to scale in part and/or have been enlarged and/or reduced in size.

LIST OF REFERENCE NUMERALS

| | |
|---|---|
| 1 | synchronizer hub |
| 2 | shifting direction |
| 3 | shifting direction |
| 4 | hub body |
| 5 | circumference |
| 6 | sleeve toothing |
| 6a | sliding sleeve |
| 7 | axial recess |
| 8 | axial recess |
| 9 | end face |
| 10 | end face |
| 11 | central axis |
| 12 | hub body segments |
| 13 | circumferential direction |
| 14 | lateral face |
| 15 | lateral face |
| 16 | base surface |
| 17 | lateral face |
| 18 | lateral face |
| 19 | base surface |
| 20 | angle |
| 21 | angle |
| 22 | end section |
| 23 | end section |
| 24 | angle |
| 25 | angle |
| 26 | radial elevation |
| 27 | toothing |
| 28 | tooth |
| 29 | transmission synchronization device |
| 30 | sliding sleeve inner toothing |
| 31 | friction package |
| 32 | friction package |
| 33 | conical ring |
| 34 | conical ring |
| 35 | conical ring |
| 36 | conical ring |
| 37 | cam |
| 38 | cam |
| 39 | coupling body |
| 40 | coupling body |
| 41 | synchronizer ring |
| 42 | synchronizer ring |
| 43 | servo pressure part |
| 44 | spring element |
| 45 | ball |
| 46 | recess |
| 47 | servo face |
| 48 | servo face |
| 49 | end face |
| 50 | elevation |
| 51 | recess |
| 52 | pressure bar |
| 53 | spring element |
| 54 | central elevation |
| 55 | end side |
| 56 | elevation |
| 57 | drive cam |
| 58 | drive cam |
| 59 | projection |
| 60 | servo pressure part |
| 61 | servo face |
| 62 | servo face |
| 63 | drive cam |
| 64 | recess |

The invention claimed is:

1. A transmission synchronization device comprising
at least one shaft,
a synchronizer hub, which is arranged on the at least one shaft, and which comprises at least one first axial recess and at least one second axial recess spaced apart therefrom,
a sliding sleeve, which is arranged radially above the synchronizer hub and is axially displaceable,
a shifting gear for each shifting direction respectively each with a toothing, arranged in an axial direction adjacent to the synchronizer hub,
a coupling body for each shifting gear respectively, each arranged on a shifting gear and pointing in the direction of the synchronizer hub,
first and second synchronizer rings, one of which is arranged in the axial direction between the synchronizer hub and a shifting gear respectively,
at least one first conical ring separate from the first and second synchronizer rings and arranged in a radial direction underneath the first synchronizer ring,
at least one second conical ring separate from the first and second synchronizer rings and for at least one shifting direction arranged between the first conical ring and the first synchronizer ring, said second conical ring having at least one cam and engaging in a recess of the coupling body via said at least one cam,
at least one first pressure part for the first shifting direction, which is mounted in the at least one first axial recess, and at least one second pressure part for the second shifting direction, which is mounted in the at least one second axial recess, wherein the synchronizer hub comprises a hub body which on its outer circumference has a sleeve toothing for the engagement of the sliding sleeve, wherein the sleeve toothing is interrupted by the at least one first axial recess and the at least one second axial recess, the first axial recess comprising first lateral faces and the second axial recess comprises second lateral faces, and the first lateral faces being inclined relative to the axial direction at a first angle, wherein the second lateral faces of the second axial recess run at a second angle to the axial direction, and wherein the second angle is not equal to the first angle of the first lateral faces, and wherein the at least one second axial recess in the axial direction has a smaller maximum cross section than the at least one first axial recess.

2. The transmission synchronization device as claimed in claim 1, wherein the first lateral faces are arranged at the first angle only in one shifting direction.

3. The transmission synchronization device as claimed in claim 1, wherein the second angle of the second lateral faces is approximately 0°.

4. The transmission synchronization device as claimed in claim 1, wherein a plurality of first and a plurality of second axial recesses are provided, the first and second axial recesses being arranged alternately.

5. The transmission synchronization device as claimed in claim 1, wherein axially inner end sections of the first lateral faces are at an angle.

6. The transmission synchronization device as claimed in claim 1, wherein a base surface delimits the at least one first axial recess radially from below, and wherein only the at least one first axial recess comprises a radial bore in a base surface.

7. The transmission synchronization device as claimed in claim 1, wherein in both shifting directions the first and second synchronizer rings are configured to be free of axial drive cams for mounting in the respective pressure part.

8. A transmission synchronization device comprising
at least one shaft,
a synchronizer hub, which is arranged on the at least one shaft, and which comprises at least one first axial recess and at least one second axial recess spaced apart therefrom,
a sliding sleeve, which is arranged radially above the synchronizer hub and is axially displaceable,
a shifting gear for each shifting direction respectively each with a toothing, arranged in an axial direction adjacent to the synchronizer hub,
a coupling body for each shifting gear respectively, each arranged on a shifting gear and pointing in the direction of the synchronizer hub,
first and second synchronizer rings, one of which is arranged in the axial direction between the synchronizer hub and a shifting gear respectively,
at least one first conical ring separate from the first and second synchronizer rings and arranged in a radial direction underneath the first synchronizer ring,
at least one second conical ring separate from the first and second synchronizer rings and for at least one shifting direction arranged between the first conical ring and the first synchronizer ring, said second conical ring having at least one cam and engaging in a recess of the coupling body via said at least one cam,
at least one first pressure part for the first shifting direction, which is mounted in the at least one first axial recess, and at least one second pressure part for the second shifting direction, which is mounted in the at least one second axial recess, wherein the synchronizer hub comprises a hub body which on its outer circumference has a sleeve toothing for the engagement of the sliding sleeve, wherein the sleeve toothing is interrupted by the at least one first axial recess and the at least one second axial recess, the first axial recess comprising first lateral faces and the second axial recess comprises second lateral faces, and the first lateral faces being inclined relative to the axial direction at a first angle, wherein the second lateral faces of the second axial recess run at a second angle to the axial direction, and wherein the second angle is not equal to the first angle of the first lateral faces, and wherein the at least one first pressure part comprises at least one servo face inclined relative to the axial direction and the at least one second pressure part is free of such servo faces.

9. The transmission synchronization device as claimed in claim 8, wherein the at least one first pressure part with the servo faces is connected to the at least one first conical ring via an axial drive cam.

10. The transmission synchronization device as claimed in claim 8, wherein the at least one second pressure part is connected to at least one first conical ring via an axial drive cam.

11. The transmission synchronization device as claimed in claim 8, wherein the at least one first pressure part is arranged in shifting direction with the shifting gear, in which a higher torque is transmitted compared to the additional shifting gear.

12. The transmission synchronization device as claimed in claim 1, wherein the first and second synchronizer rings comprise stop surfaces for delimiting the relative rotatability with respect to the synchronizer hub, and wherein the stop surfaces interact with the lateral walls of the axial recesses of the synchronizer hub.

13. A transmission synchronization device comprising
at least one shaft,
a synchronizer hub, which is arranged on the at least one shaft, and which comprises at least one first axial recess and at least one second axial recess spaced apart therefrom,
a sliding sleeve, which is arranged radially above the synchronizer hub and is axially displaceable,
a shifting gear for each shifting direction respectively each with a toothing, arranged in an axial direction adjacent to the synchronizer hub,
a coupling body for each shifting gear respectively, each arranged on a shifting gear and pointing in the direction of the synchronizer hub,
first and second synchronizer rings, one of which is arranged in the axial direction between the synchronizer hub and a shifting gear respectively,
at least one first conical ring separate from the first and second synchronizer rings and arranged in a radial direction underneath a first synchronizer ring of the two synchronizer rings,
at least one second conical ring separate from the first and second synchronizer rings and for at least one shifting direction arranged between the first conical ring and the first synchronizer ring, said second conical ring having at least one cam and engaging in a recess of the coupling body via said at least one cam,
at least one first pressure part for the first shifting direction, which is mounted in the at least one first axial recess, and at least one second pressure part for the second shifting direction, which is mounted in the at least one second axial recess, wherein the synchronizer hub comprises a hub body which on its outer circumference has a sleeve toothing for the engagement of the sliding sleeve, wherein the sleeve toothing is interrupted by the at least one first axial recess and the at least one second axial recess, the first axial recess comprising first lateral faces and the second axial recess comprises second lateral faces, and the first lateral faces being inclined relative to the axial direction at a first angle, wherein the second lateral faces of the second axial recess run at a second angle to the axial direction, and wherein the second angle is not equal to the first angle of the first lateral faces, and wherein the first synchronizer ring is connected to the first pressure part via a drive cam.

* * * * *